US009678819B2

(12) United States Patent
Inoue et al.

(10) Patent No.: US 9,678,819 B2
(45) Date of Patent: Jun. 13, 2017

(54) COMMUNICATION APPARATUS, METHOD OF CONTROLLING THE SAME AND STORAGE MEDIUM

(71) Applicant: CANON KABUSHIKI KAISHA, Tokyo (JP)

(72) Inventors: Yutaka Inoue, Abiko (JP); Yosui Naito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/833,468

(22) Filed: Aug. 24, 2015

(65) Prior Publication Data
US 2016/0070613 A1 Mar. 10, 2016

(30) Foreign Application Priority Data
Sep. 8, 2014 (JP) .................................. 2014-182499

(51) Int. Cl.
H04M 1/24 (2006.01)
G06F 11/07 (2006.01)

(52) U.S. Cl.
CPC ...... G06F 11/0751 (2013.01); G06F 11/0733 (2013.01)

(58) Field of Classification Search
USPC ....................................... 714/43; 379/100.01
See application file for complete search history.

(56) References Cited

U.S. PATENT DOCUMENTS

| 5,040,209 A | * | 8/1991 | Greenberg | H04M 9/02 379/373.05 |
| 5,146,489 A | * | 9/1992 | Telibasa | H04N 1/32704 379/100.01 |
| 5,175,746 A |  | 12/1992 | Inoue et al. | 375/13 |
| 5,311,580 A | * | 5/1994 | Otsuka | H04N 1/32704 375/308 |
| 5,420,884 A |  | 5/1995 | Inoue | 375/229 |
| 5,448,626 A | * | 9/1995 | Kajiya | H04M 3/5307 379/100.08 |
| 5,506,891 A | * | 4/1996 | Brown | H04M 1/654 379/100.06 |
| 5,706,342 A | * | 1/1998 | Baeder | H04M 3/2272 379/194 |
| 5,719,924 A | * | 2/1998 | Haneda | H04N 1/32128 358/442 |
| 5,737,094 A | * | 4/1998 | Hui | H04N 1/00127 358/407 |
| 6,272,210 B1 | * | 8/2001 | Hsieh | H04M 11/06 379/171 |

(Continued)

FOREIGN PATENT DOCUMENTS

JP 2001-016352 1/2001

Primary Examiner — Kamini Patel
(74) Attorney, Agent, or Firm — Fitzpatrick, Cella, Harper & Scinto

(57) ABSTRACT

A history of transmission/reception via a line is stored in association with the line, and it is detected whether or not a communication apparatus is physically connected to the line. Then if the line is detected to be disconnected, it is determined whether or not a history of transmission/reception regarding the disconnected line is stored. If it is determined that the history of transmission/reception regarding the disconnected line is stored, notification is given to a user that the line is disconnected.

15 Claims, 16 Drawing Sheets

(56) References Cited

U.S. PATENT DOCUMENTS

| | | | | |
|---|---|---|---|---|
| 6,393,123 | B1* | 5/2002 | Staver | H04M 1/82 |
| | | | | 379/377 |
| 6,681,011 | B1* | 1/2004 | Staver | H04M 1/82 |
| | | | | 379/377 |
| 6,836,541 | B2 | 12/2004 | Inoue et al. | 379/212.01 |
| 7,061,634 | B1* | 6/2006 | Ogura | G03G 15/5079 |
| | | | | 358/1.15 |
| 8,988,709 | B2 | 3/2015 | Naito | H04M 11/066 |
| 2002/0009187 | A1 | 1/2002 | Inoue et al. | H04M 3/42 |
| 2007/0071207 | A1* | 3/2007 | Kashiwada | H04N 1/3209 |
| | | | | 379/188 |
| 2008/0148287 | A1* | 6/2008 | Regnier | H04L 67/16 |
| | | | | 719/318 |
| 2012/0136760 | A1* | 5/2012 | Hur | G06Q 40/12 |
| | | | | 705/30 |
| 2012/0154873 | A1 | 6/2012 | Naito | 358/406 |
| 2013/0216031 | A1* | 8/2013 | Naito | H04M 11/066 |
| | | | | 379/100.01 |
| 2015/0249758 | A1* | 9/2015 | Inoue | H04N 1/00312 |
| | | | | 379/100.01 |
| 2015/0256686 | A1* | 9/2015 | Young | H04N 1/00477 |
| | | | | 358/1.15 |
| 2016/0044186 | A1* | 2/2016 | Inoue | H04N 1/00209 |
| | | | | 358/1.15 |

\* cited by examiner

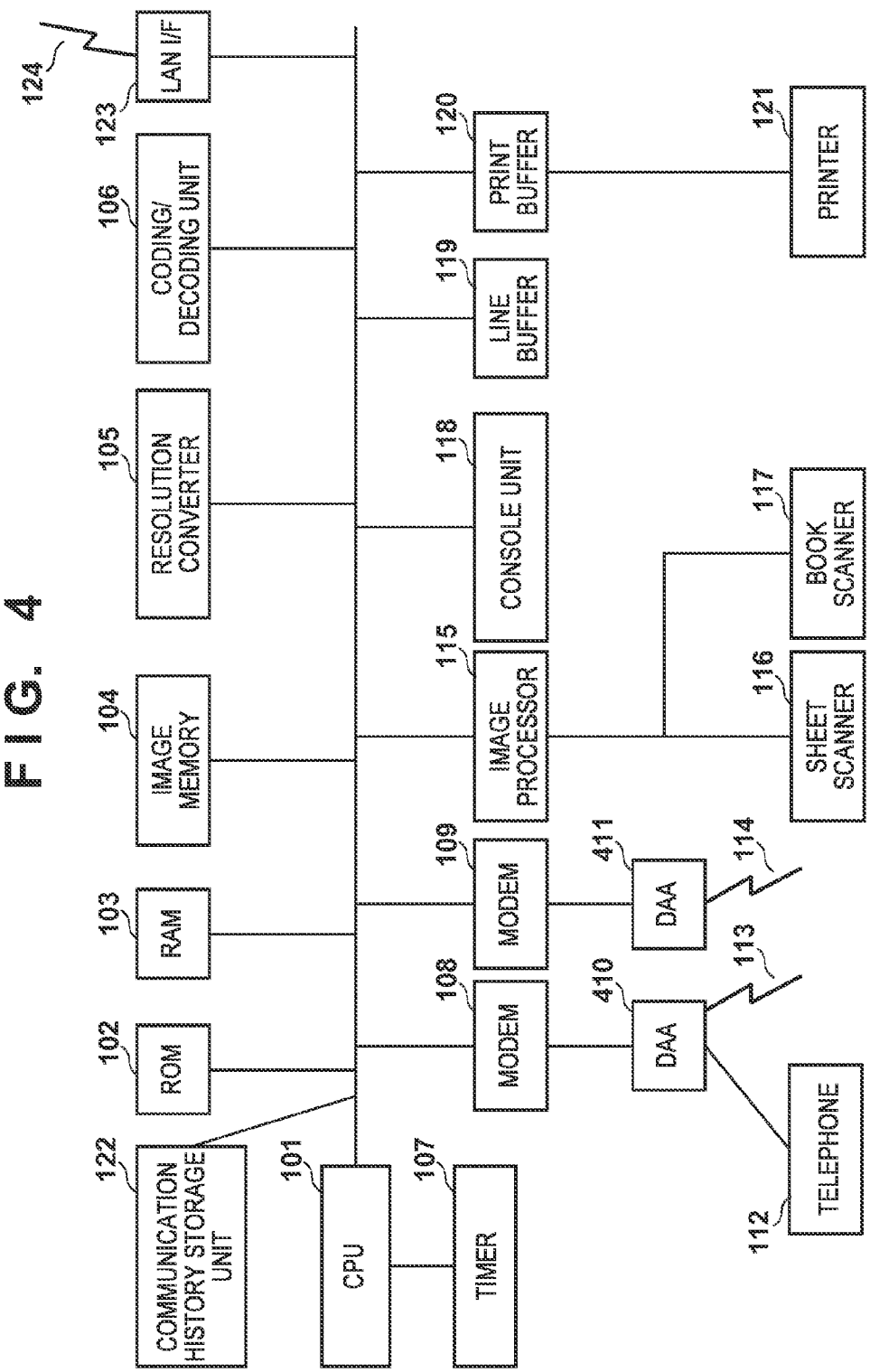

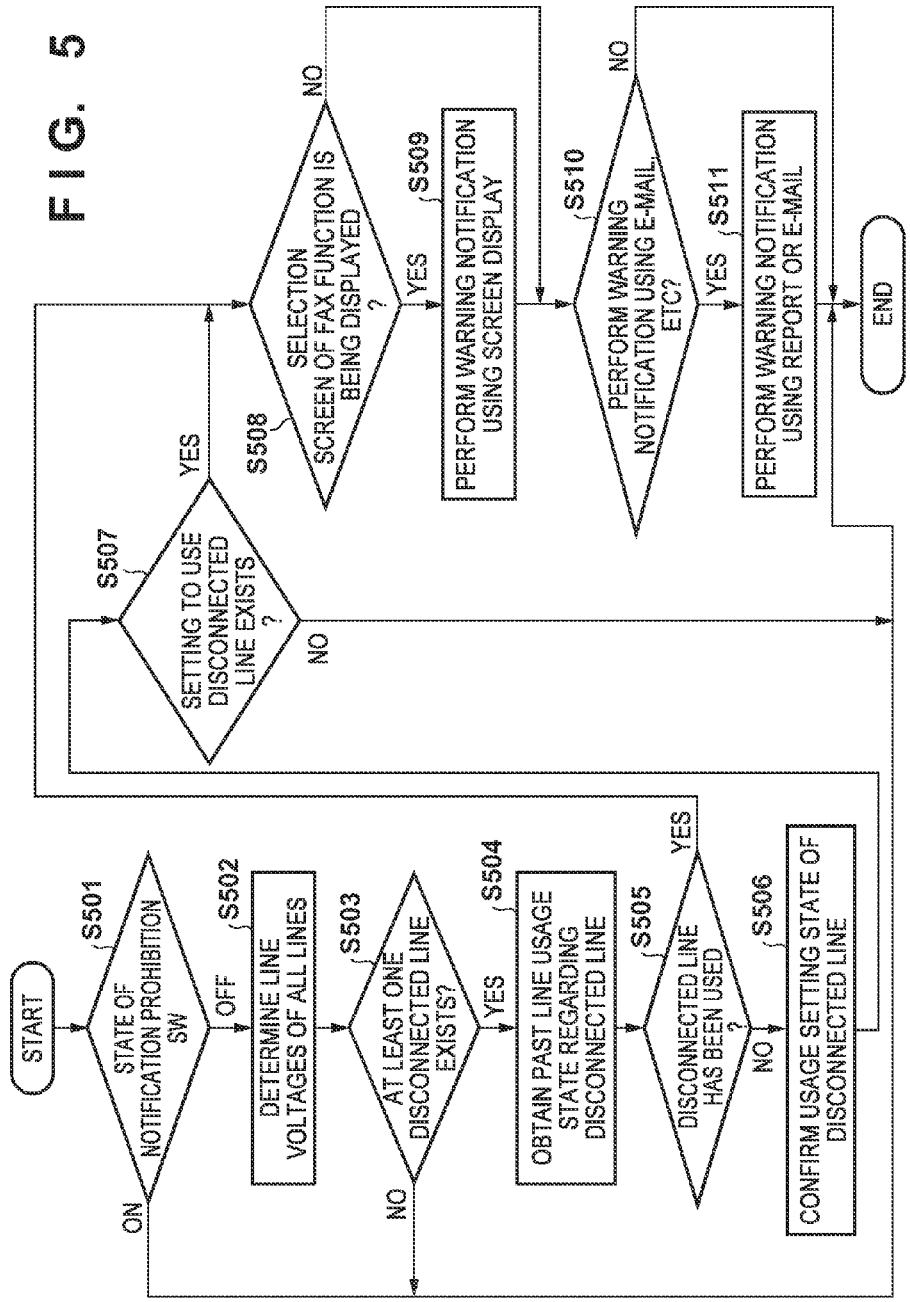

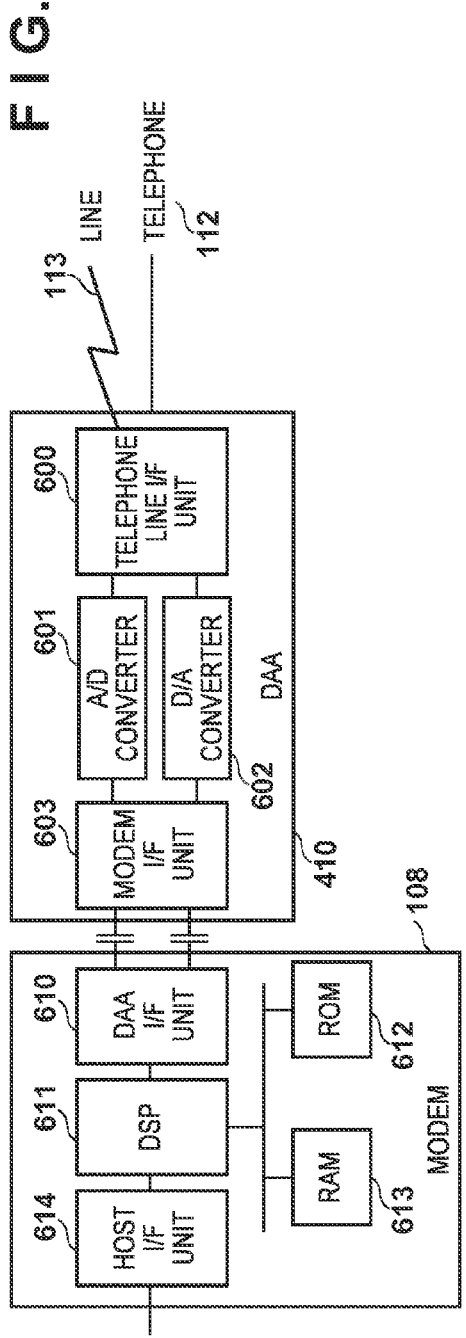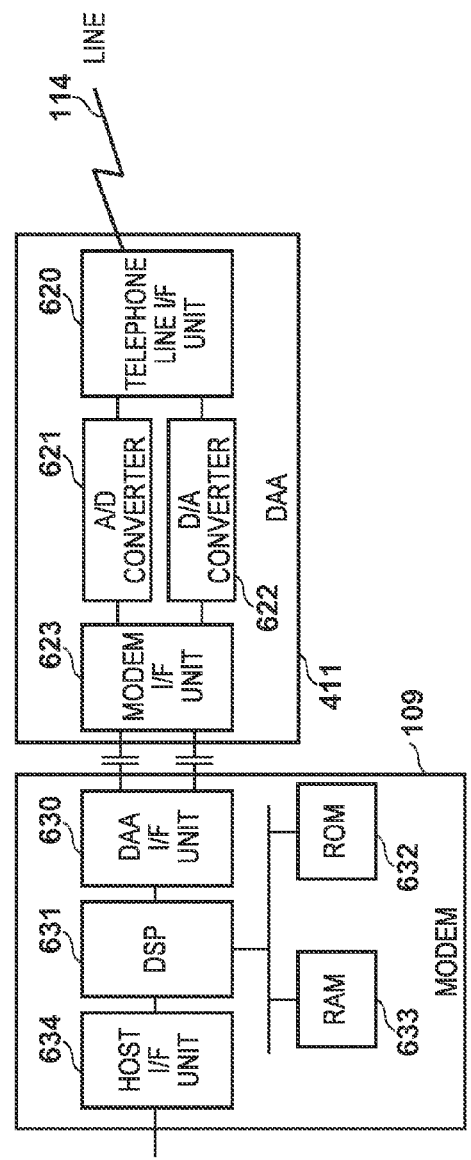

F I G. 10B

Fri,12,Nov 2013 14:50:55

DISCONNECTED LINE DETECTION REPORT
-------------------------------------------------
THE CABLE FOR THE FAX LINE 1 OF
THIS APPARATUS IS NOT CONNECTED.
PLEASE CHECK CABLE CONNECTION STATE
AND IF THE CABLE IS TO BE USED, PLEASE
CONNECT THE CABLE.
IF THE CABLE IS NOT TO BE USED,
PLEASE CHANGE THE TRANSMISSION LINE
SETTING OF THE ADDRESS BOOK.

F I G. 10C

Date  Fri,12,Nov 2013 14:50:55
From : MFP0007
To : MFP0007_Owner
Subject : MFP0007  DISCONNECTED LINE
                   DETECTION NOTIFICATION
-------------------------------------------------
THE CABLE FOR THE FAX LINE 1 OF
THE MFP IS NOT CONNECTED.
PLEASE CHECK CABLE CONNECTION STATE
AND IF THE CABLE IS TO BE USED, PLEASE
CONNECT THE CABLE. IF THE CABLE IS
NOT TO BE USED, PLEASE CHANGE
THE TRANSMISSION LINE SETTING OF
THE ADDRESS BOOK.

FIG. 12A

FAX DESTINATION REGISTRATION (DETAILS)

F CODE

PASSWORD

▨ TRANSMISSION SPEED   33600bps   ▨ LINE SELECTION

▨ ECM TRANSMISSION   ON   OFF

LINE 1
LINE 2
AUTO

CANCEL   OK

FIG. 12B

USER TELEPHONE NUMBER REGISTRATION (LINE 1)

FAX=0311112222

SPACE   +   ◀   ▶   BACKSPACE

CANCEL   OK

FIG. 12E

SELECTION SETTING OF LINE TO BE USED

☐ LINE 1

TO BE USED | NOT TO BE USED

☐ LINE 2

TO BE USED | NOT TO BE USED

CANCEL | OK

FIG. 12F

☐ TRANSFER CONDITION SETTING
☐ RECEPTION LINE:

FACSIMILE: COMMON LINE
FACSIMILE: LINE 1
FACSIMILE: LINE 2

☐ COMMUNICATION PARTNER'S TELEPHONE NUMBER: | IS NOT RELEVANT | SET
☐ F CODE: | DOES NOT EXIST | SET
☐ PASSWORD: | DOES NOT EXIST | SET

CANCEL | OK

COMMUNICATION APPARATUS, METHOD OF CONTROLLING THE SAME AND STORAGE MEDIUM

BACKGROUND OF THE INVENTION

Field of the Invention

The present invention relates to a communication apparatus, a method of controlling the same, and a storage medium.

Description of the Related Art

In MFPs equipped with a FAX function, warning notification to a user has not previously been performed even in the case where a line is unavailable due to some cause such as coming off of a line cable, abnormality of a FAX board, or abnormality of an exchange. Therefore, the user only finds out that the line is unavailable when a job is terminated with error after he or she has instructed the start of FAX transmission. Therefore, a method for, in the case where a line is in an unavailable state, performing warning notification to that effect and informing a user before a job is input is desired. In relation to this, for example, Japanese Patent Laid-Open No. 2001-16352 discloses a method for detecting coming off of a line cable by measuring a line voltage and performing warning notification.

According to the above conventional technology, it is possible to detect a state where a communication apparatus and a line are not physically connected because a cable is not connected, and to warn a user in such a case. However, in the case where a user does not regularly use a FAX function, it is conceivable that a FAX line for a facsimile and a communication apparatus are not connected in the first place. Similarly, with respect to a multi-function peripheral or the like to which a plurality of FAX lines can be connected, in the case where a user regularly uses only specific lines, it is envisioned that a FAX line that is not in use is not physically connected. In such a case, it is also conceivable that always performing warning display that the line not physically connected is a disconnected line is bothersome to the user.

Moreover, there is a problem in that, when determining whether or not a line is physically connected based only on a line voltage, it is not possible to distinguish whether the line is actually not physically connected, or whether there is abnormality of an exchange or the like.

SUMMARY OF THE INVENTION

An aspect of the present invention is to eliminate the above-mentioned problems with conventional technology.

A feature of the present invention is to provide a technique to notify a user, in the case where there is a disconnected line that has been used in the past, that the line is disconnected, so that needless notification regarding a line that is not connected is eliminated.

According to a first aspect of the present invention, there is provided a communication apparatus comprising: a history storage unit configured to store a history of transmission/reception via a line in association with the line; a detection unit configured to detect whether or not the communication apparatus is physically connected to the line; a first determination unit configured to, if the detection unit detects that the line is disconnected, determine whether or not a history of transmission/reception regarding the disconnected line is stored in the history storage unit; and a notification unit configured to notify a user that the line is disconnected if the first determination unit determines that the history of transmission/reception regarding the disconnected line is stored in the history storage unit.

According to a second aspect of the present invention, there is provided a method of controlling a communication apparatus, comprising: storing, in a memory, a history of transmission/reception via a line in association with the line; detecting whether or not the communication apparatus is physically connected to the line; if it is detected in the detecting that the line is disconnected, determining whether or not a history of transmission/reception regarding the disconnected line is stored in the memory; and notifying a user that the line is disconnected if it is determined in the determining that the history of transmission/reception regarding the disconnected line is stored in the memory.

Further features of the present invention will become apparent from the following description of exemplary embodiments with reference to the attached drawings. In the attached drawings, the same or similar components are designated with the same reference numerals.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram for describing a hardware configuration of a communication apparatus (MFP) according to a second embodiment.

FIG. 5 is a flowchart for describing processing for performing a warning when there is a disconnected line in the MFP according to the second embodiment.

FIGS. 6A and 6B are diagrams for describing a voltage detection function performed by a DAA and a modem, in the MFP according to the second embodiment.

FIGS. 10A to 10C are diagrams each showing an example of warning notification in the MFP according to the second embodiment.

FIGS. 12A to 12F are diagrams showing examples of usage registration of lines in the MFP according to the second embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
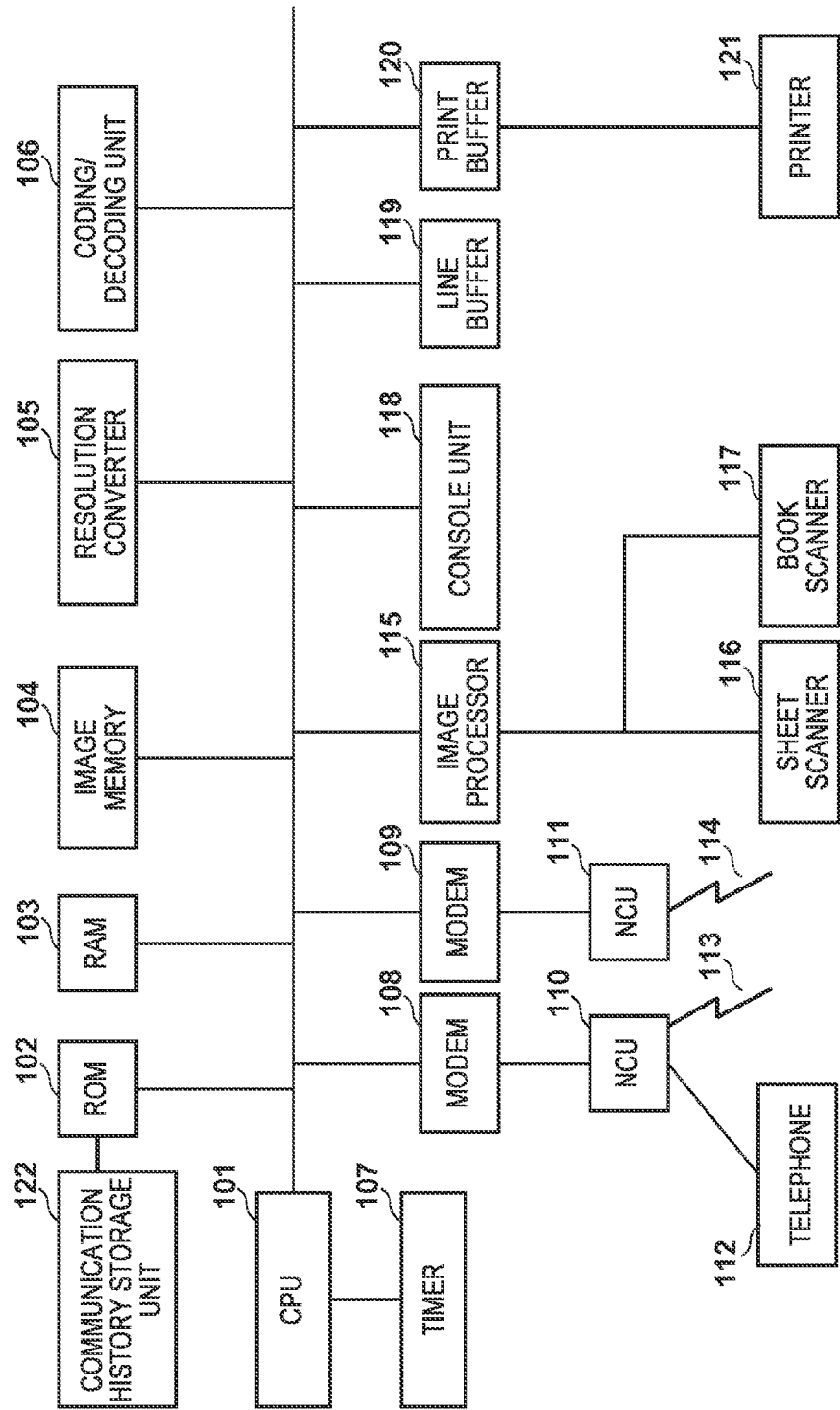
FIG. 1 is a block diagram for describing a hardware configuration of a communication apparatus (MFP) according to a first embodiment of the present invention.

FIG. 1 is a block diagram for describing the hardware configuration of a communication apparatus according to the first embodiment of the present invention. This communication apparatus will be described as a multi-function peripheral (MFP) having functions of FAX, printing, scanning and the like, but the communication apparatus according to the present invention is not limited thereto.

A CPU 101 controls the overall operations of this communication apparatus (MFP). A ROM 102 stores the programs to be executed by the CPU 101. A RAM 103 is used as a work memory for temporarily storing various types of data when the CPU 101 executes processing. An image memory 104 is configured by, for example, a DRAM or the like and is used for accumulating image data. A resolution converter 105 performs resolution conversion such as millimeter-inch conversion of raster data or the like. A coding/decoding unit (codec) 106 performs coding and decoding processing on image data. A timer 107 clocks time in accordance with an instruction of the CPU 101, and when the instructed time elapses, notifies the CPU 101 to that effect by performing interruption or the like. Modems 108 and 109 demodulate a modulated signal received via a line, or conversely modulate a signal and send the modulated signal out to a line. NCUs 110 and 111 control interfaces to a network. The NCU 110 has a connection terminal to a telephone, and a hook detection circuit for detecting off-hook/on-hook using the terminal. A telephone 112 is a hand set (telephone without a dialer) or an external telephone (answerphone or the like) connected to a telephone line 113 via the NCU 110. Lines 113 and 114 are dial-in contract telephone lines. An image processor 115 performs correction processing on image data read by a scanner and outputs high definition image data. A sheet scanner 116 and a book scanner 117 have a CS image sensor, a document feed mechanism and the like so as to optically read a document and converts it into electrical image data. The book scanner 117 is capable of reading a double-sided document. A console unit 118 has a keyboard, a display unit and the like, and is used for an operator to perform various input operations. On this display unit, it is indicated that an immediate dial operation is possible, if a hand set serving as the telephone 112 is on-hook, and that communication is being conducted, when the telephone 112 is off-hook. The display unit also displays that communication reservation can be accepted. A line buffer 119 stores image data in units of lines when transferring the image data. A print buffer 120 is a buffer memory having a capacity of one page for storing print data or the like that is to be output to a printer 121. The printer 121 is a printer using an electrophotographic method, for example, which prints an image on a sheet based on received image data or file data, and can also perform double-sided printing. A communication history storage unit 122 is a nonvolatile storage unit such as a backed-up SRAM, a flash ROM or an HDD, and stores a transmitted or received FAX job, a communication result thereof and the like in association with a line used for the transmission/reception.

Figure 2:
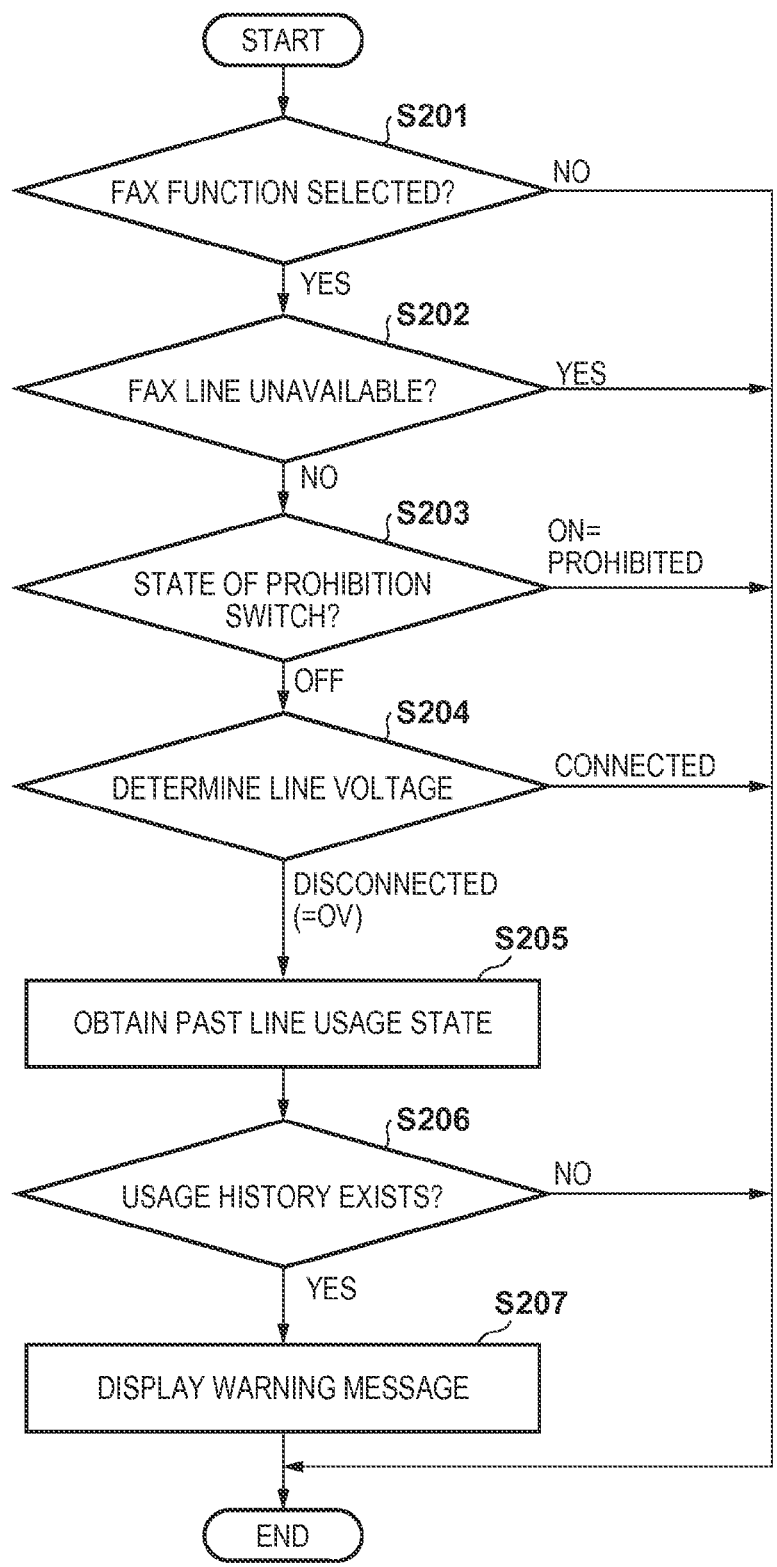
FIG. 2 is a flowchart for describing processing in accordance with a connection state to a line when a FAX function is selected in the MFP according to the first embodiment.

FIG. 2 is a flowchart for describing processing in accordance with the connection state to a line when the FAX function is selected in the MFP according to the first embodiment. Note that the program for executing this processing is stored in the ROM 102, and the processing shown by this flowchart is achieved by the CPU 101 executing that program.

First, in step S201, the CPU 101 determines whether or not the FAX function is selected, and if a function other than FAX (for example, copy) is selected, this processing is ended. If it is determined in step S201 that the FAX function is selected, the procedure advances to step S202, and the CPU 101 determines whether or not a FAX line (any one of the lines 113 and 114) is set to unavailable by a user's setting. Here, if the CPU 101 determines that the FAX line is not set to unavailable in step S202, the procedure advances to step S203. However, if it is determined that the FAX line is set to unavailable, this processing is ended. In step S203, the CPU 101 determines whether or not selection has been made to prohibit warning display. Here, if the setting has been made so as to not perform warning display, this processing is ended. Note that the setting for performing or not performing this warning display can be set via an operation screen (not illustrated) by the user, for example, and the content of the setting is assumed to be stored in the RAM 103. If the CPU 101 determines in step S203 that the setting has been made so as to perform warning display, the procedure advances to step S204, and the CPU 101 detects the value of the line voltage of the FAX line. Here, in the case where the line voltage is 0 V, it is determined that the line is in a disconnected state, that is, the line is not physically connected, and the procedure advances to step S205. On the other hand, in the case where the line voltage is not 0 V, it is determined that the line is physically connected, and this processing is ended.

In step S205, the CPU 101 obtains a past usage state of the line from the communication history storage 122, and the procedure advances to step S206. In step S206, the CPU 101 then determines whether or not the line has been used in the past based on the obtained history information. It is then determined that the line is not regularly used by the user in the case where there is no usage history of the line, and this processing is ended without performing the warning display. On the other hand, in the case where the CPU 101 determines in step S206 that there is a usage history, the procedure advances to step S207, and the warning display is performed so as to indicate on the display unit of the console unit 118 that the line cannot be used because the line is not physically connected. Note that, at this time, the latest date and time of the usage history may be extracted from the usage histories and a message indicating until what date and what time the line was available or the like may be added.

Figure 3:
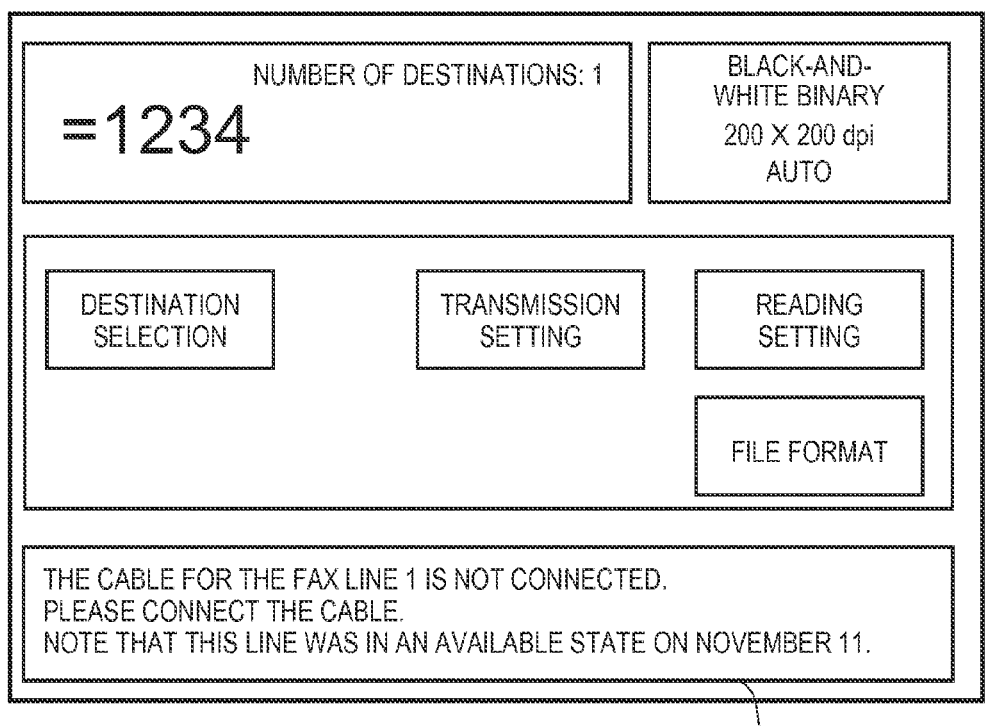
FIG. 3 is a diagram showing an example of warning display on the MFP according to the first embodiment.

FIG. 3 depicts a view showing an example of the warning display in the MFP according to the first embodiment.

Here, a message display area 301 is provided on a part of the operation screen of the FAX function, and the warning display that the line is disconnected is performed in the message display area 301. At this time, if the message display area 301 is too small for displaying a message, or if a plurality of warning messages are required to be displayed at the same time, toggle display may be performed. Note that, during the warning display that the line is not physically connected, the operation of a start key for instructing a start of FAX transmission for which the line is designated is invalidated.

As described above, according to the first embodiment, in the case where a line to be used is not physically connected, the usage history of the line is referred to, and if the usage history of the line exists, the warning display that the line is not connected is performed. Accordingly, in the case where the disconnected line is a line that a user does not regularly use or the like, it is possible to prevent the warning display that the line is not connected from being performed.

Moreover, it is possible to let the user know the past usage state of the line by displaying a message for informing until what date and time the line was available in the warning display that the line is not connected, as shown in FIG. 3, for example.

Second Embodiment

Next, the second embodiment of the present invention will be described.

FIG. 4 is a block diagram for describing the hardware configuration of the communication apparatus (MFP) according to the second embodiment. Note that the same portions as those in FIG. 1 are denoted by the same reference numerals in FIG. 4, and the description thereof is omitted.

In this second embodiment, the NCUs 110 and 111 in FIG. 1 are replaced by line interfaces as silicon DAAs (data access arrangement) 410 and 411. Conventionally, for this line interface, a circuit configured only by discrete components was used, but recently a silicon DAA (hereinafter, abbreviated as DAA) in which components are integrated on one IC except for a few external components has been developed, and this has become predominant. The DAA 410 includes a connection terminal for connecting a telephone or a hand set and a line connection terminal for connecting a line. By using this DAA, which will be described later, and a modem, it is possible to perform hook detection of a telephone or a hand set, incoming call detection, and detection of line voltages. A LAN interface 123 is used for transmission and reception of e-mails or the like between the MFP and an external apparatus such as an external PC via a network 124.

FIG. 5 is a flowchart for describing processing for performing a warning when there is a disconnected line with regard to the MFP according to the second embodiment. Note that the program for executing this processing is stored in the ROM 102, and the processing shown by this flowchart is achieved by that CPU 101 executing the program.

First, in step S501, the CPU 101 detects the state of a switch for prohibiting warning notification and, if this switch is set to "ON", ends this processing without performing warning notification. This switch is a switch that a user sets in the MFP in advance, and the setting of this switch is stored in a nonvolatile memory or the like of the MFP. Due to the user setting this switch to "ON", the MFP will not perform warning notification under any circumstances even if there is a disconnected line. In the case where the CPU 101 determines in step S501 that the switch is set to "OFF", the procedure advances to step S502, and the CPU 101 determines the line voltages of all the housed lines. In this line voltage determination, in the case where each of the line voltages is 0V, the line is determined to be disconnected, and in the case where the voltage is not 0 V, the line is determined to be connected.

Here, a voltage detection function performed by the above-described DAAs 410 and 411 and the modems 108 and 109 will be described.

FIG. 6A is a function block diagram of the DAA 410 and the modem 108.

The DAA 410 has a telephone line I/F unit 600, an A/D converter 601 for A/D converting an output of the telephone line I/F unit 600, that is, a signal on a telephone line, and a D/A converter 602 for converting a digital signal from the modem 108 into an analog signal, in order to perform modulation/demodulation using the modem 108. A signal A/D converted by the A/D converter 601 is output to the modem 108 via a modem I/F unit 603. Moreover, a digital signal output from the modem 108 is sent to the D/A converter 602 via the modem I/F unit 603, and the D/A converted analog signal is output to the line 113 and the telephone 112. Furthermore, a hook detection function, an incoming call detection function and a line voltage detection function can also be supported by processing the A/D converted signal with the modem 108.

The digital line signal from the DAA 410 is taken into the modem 108 through a DAA I/F unit 610 of the modem 108. The DAA I/F unit 610 and the modem I/F unit 603 are DC-insulated interfaces. Inside the modem 108, there are a processor 611 called DSP (digital signal processor), a ROM 612 and a RAM 613 for storing programs and data of the DSP 211, and a host I/F unit 614 such as a serial I/F.

In this manner, the modem 108 performs software processing on the digital signal with the DSP 611. The modem 108 also inputs, from the DAA 410, the digitalized signal resulting from a line signal, and performs incoming call signal detection, hook-up detection of a telephone/hand set, and detection of line voltages by processing with the DSP 611. In this manner, the voltage detection of the line is possible by digitalizing a line signal in the DAA 410 and by detecting the digitalized line signal with the DSP 611 of the modem 108. Note that, if the line signal is 0 V here, it is determined that the line is not connected, and if it is other than 0 V, it is determined that the line is in a line connection state.

FIG. 6B is a function block diagram of the DAA 411 and the modem 109. In FIG. 6B, in comparison to FIG. 6A, only a line 114 is connected to the DAA 411 and the telephone is not connected. Usually, with respect to the MFP housing a plurality of lines, only one telephone is supported, and therefore a telephone is not connected to the DAA 411 in FIG. 6B. Functions other than that are the same as those in FIG. 6A. That is, 620 to 623 in FIG. 6B are the same as 600 to 603 in FIG. 6A, and 630 to 634 in FIG. 6B are the same as 610 to 614 in FIG. 6A, and therefore description thereof is omitted. The principle described with reference to FIG. 6A also makes it possible to detect line voltages in FIG. 6B.

Referring to FIG. 5 again, in step S503, the CPU 101 determines, based on the voltage state of each line determined in step S502, whether or not there is at least one disconnected line that is not physically connected. Here, if there are not any disconnected lines, this processing is ended. In the case where the CPU 101 determines in step S503 that there is at least one disconnected line, the procedure advances to step S504, and the CPU 101 obtains the past line usage state of the disconnected line from the communication history storage 122. The procedure then advances to step S505 and the CPU 101 determines whether or not the disconnected line has been used in the past based on the history information of communication. In the case where the line has not been used at all, the procedure advances to step S506, and the usage setting state in the MFP is confirmed. Otherwise the procedure advances to step S508. Note that "past" herein refers to a time period of the communication history stored in the MFP or a certain period of time going back from the present point in time such as the past one month, for example. Because the storage area of the communication history storage 122 is limited, history information after a certain period of time is erased. The storage capacity of the communication history storage 122 is about 100 to 2000 histories although it depends on the MFP.

Figure 7A:
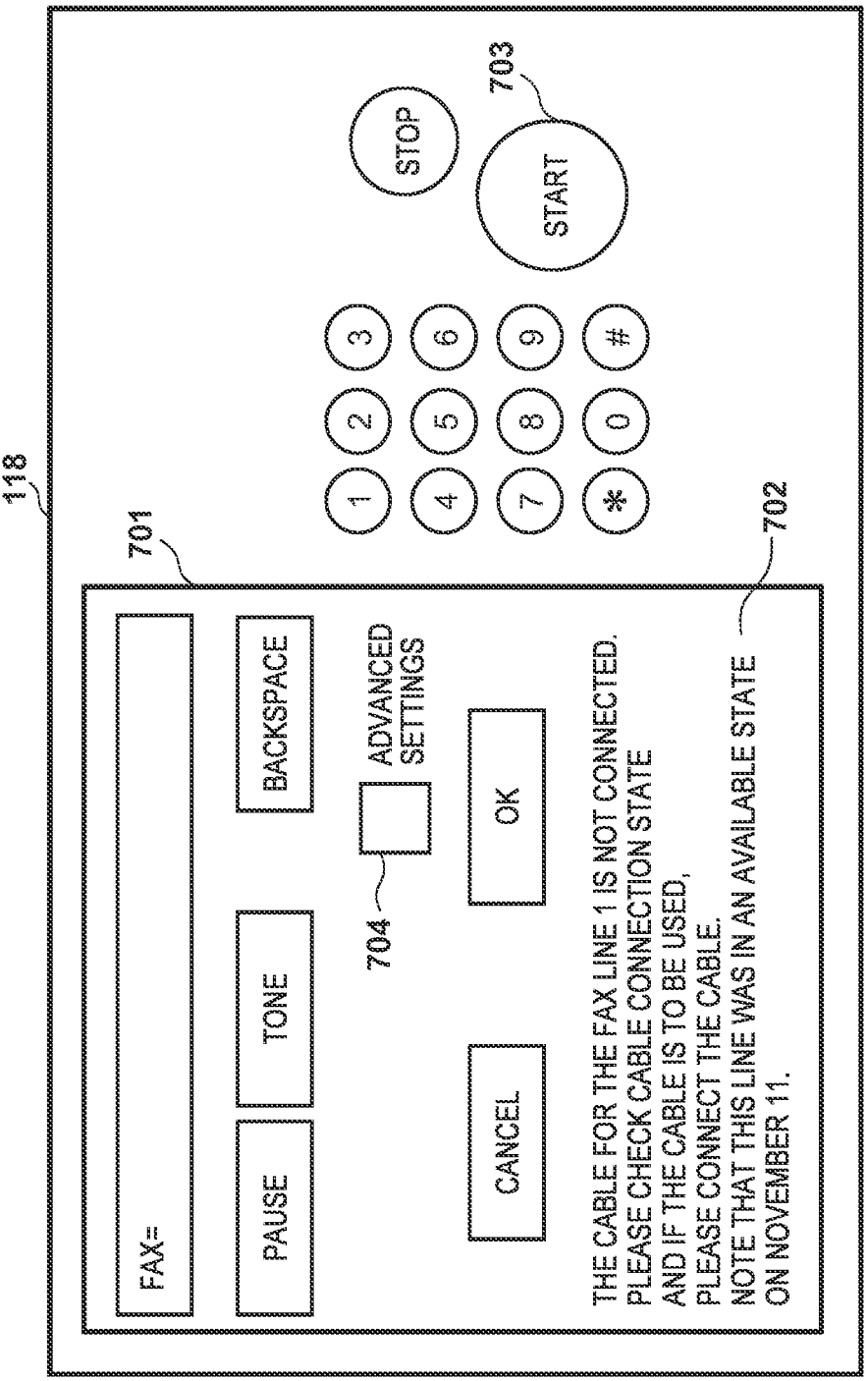
FIGS. 7A to 7C are diagrams each showing an example of warning notification when there is a disconnected line in the MFP according to the second embodiment.
Figure 10A:
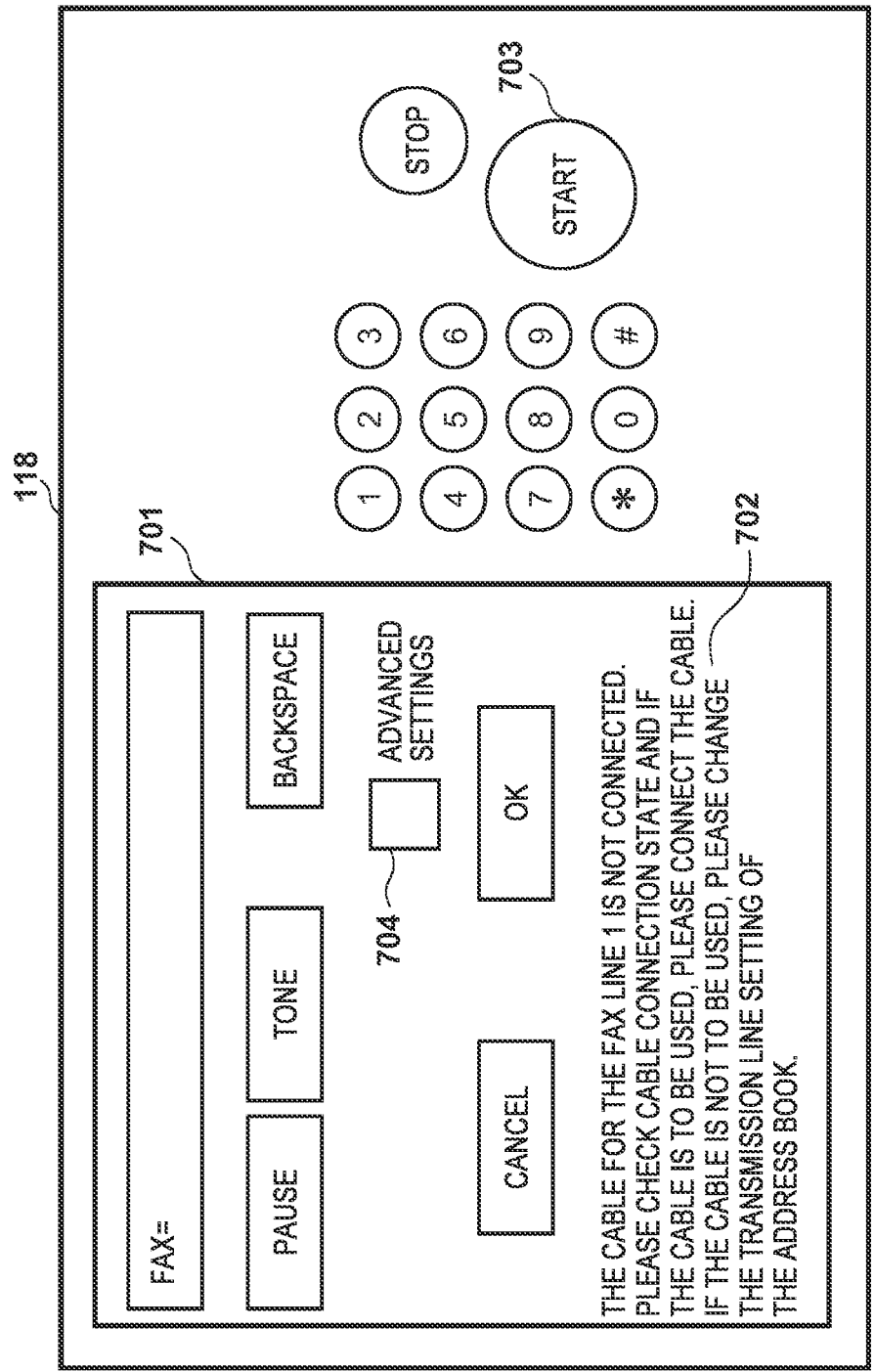

In step S508, the CPU 101 determines the selection state of the functions of the MFP, and specifically determines whether or not a screen on which the FAX function is selected (screen in FIG. 7A or FIG. 10A, which will be described later) is displayed. Note that the MFP has not only the FAX function but also many other functions such as COPY, SEND and BOX, and a selection screen of each of these functions is displayed on an initial screen. A FAX function selection screen such as that shown in FIG. 7A or FIG. 10A is then displayed in the case where FAX is selected on this initial screen.

If the CPU 101 determines in step S508 that the selection screen of the FAX function is displayed, the procedure advances to step S509, and a message is displayed on the screen so that the user is warned that there is a disconnected line. On the other hand, in the case where it is determined in step S508 that the selection screen of the FAX function is not displayed, step S509 is skipped and the procedure advances to step S510. In step S510, the CPU 101 determines whether or not a warning that there is a disconnected line is to be notified by report printing or e-mail. In the case where it is determined that the warning display is to be performed by report printing or e-mail, the procedure advances to step S511, and the warning notification is performed using a report or an e-mail. On the other hand, in the case where the CPU 101 determines in step S510 that the warning notification is not to be performed by report printing or e-mail, this processing is ended without performing the warning notification.

Note that the determination in step S510 by the CPU 101 regarding whether or not to perform the warning notification by report printing or e-mail is made, for example, by a user setting in advance whether or not to perform the warning notification by report printing or e-mail and storing the setting in a memory so that the determination is made in accordance with the stored setting. Here, the warning notification is a warning notification in the case where a disconnected line that has a history of past usage is detected, and, on the warning notification, the time and date when the line was recently used is extracted from the usage history and information indicating until what date and time the line was available is added to the notification message.

Note that any of the following three techniques is used for the warning notification in the second embodiment.

(a) A message is displayed on the display unit of the console unit 118 of the MFP.

(b) A report with a warning message is printed by the printer 121 of the MFP.

(c) A warning message is transmitted by an e-mail from the MFP through a LAN I/F unit 123 of the MFP and the network 124 to a preset user (such as the administrator of the MFP), using a mail transmission function of the MFP.

Figure 7B:
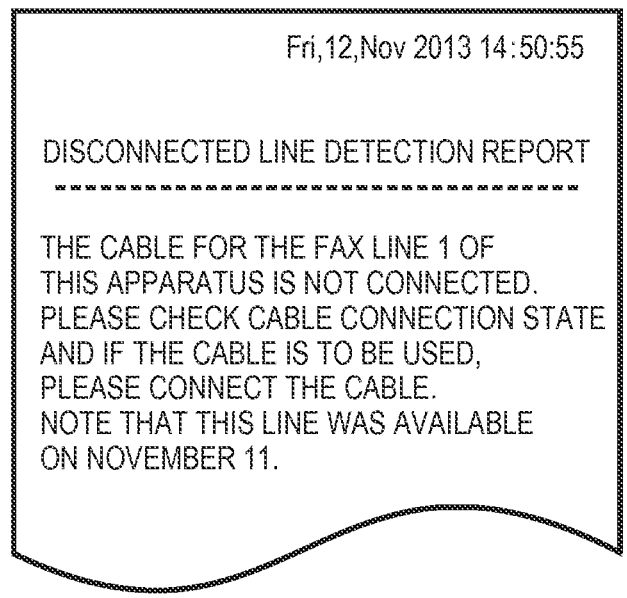
Figure 7C:
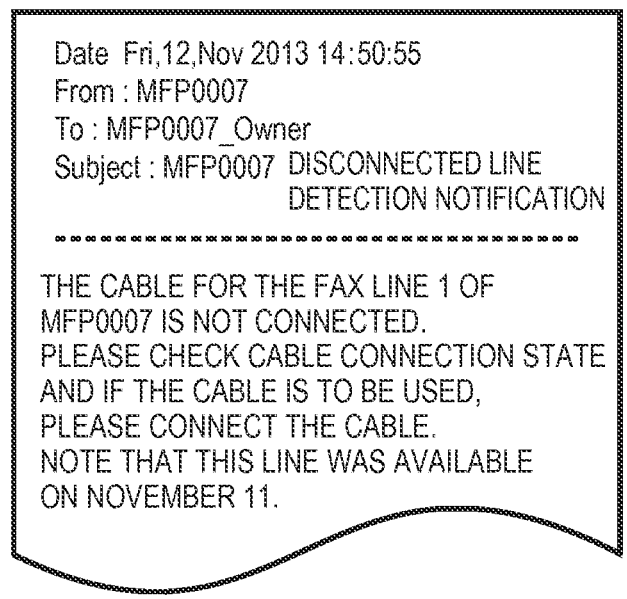

FIG. 7A to FIG. 7C depict views each showing an example of warning notification when there is a disconnected line with respect to the MFP according to the second embodiment. Here, the contents of the notification in the case where a line that has a history of transmission/reception is disconnected are shown.

FIG. 7A shows the case where a message is displayed on the display unit 701 of the console unit 118. On the lower left side of the console unit 118 of the MFP, there is a message display area 702 called a status line, where the warning message indicating that there is a disconnected line is displayed. In the case where this message display area 702 is small, or in the case where a plurality of warning messages are displayed at the same time, toggle display may be performed. The example of the message in FIG. 7A indicates the case where a FAX line 1 is detected to be in a disconnected state and there is a history indicating that the FAX line has been used in the past. Moreover, the latest time and date when the FAX line was available is displayed based on the history.

In this manner, it is possible to notify the user that the FAX line 1 is disconnected and to prompt the user to connect the cable if the FAX line 1 is to be used. Furthermore, the latest time and date when that FAX line 1 was available is displayed based on the history of communication regarding the line, and therefore the user can also determine since when the FAX line became disconnected or abnormal.

Next, a technique for preventing transmission using a FAX line for which a warning message is being displayed will be described.

In FIG. 7A, numeric keypad (0-9, #, *) buttons for inputting a telephone number or the like, a start key 703 for instructing to start fax transmission, a stop key for stopping an operation that is being performed, or the like are arranged on the right side of a display unit 701. Moreover, when an advanced settings button 704 on the lower right part of the display screen is pressed, transition is made to a selection screen of a transmission line, and therefore the user can select a line to be used for the transmission via the screen. Here, although a FAX line 1 is selected as a transmission line in FIG. 7A, the FAX line 1 is disconnected, and therefore transmission will not be possible if start of the transmission is instructed in this state.

Therefore, in the second embodiment, in FIG. 7A, in the case where a line selected as the transmission line and a line for which warning notification is being performed are matched, the start key 703 to instruct to start facsimile transmission in FIG. 7A is invalidated. Therefore, in this case, facsimile transmission is not started even if the user presses the start key 703.

Figure 8:
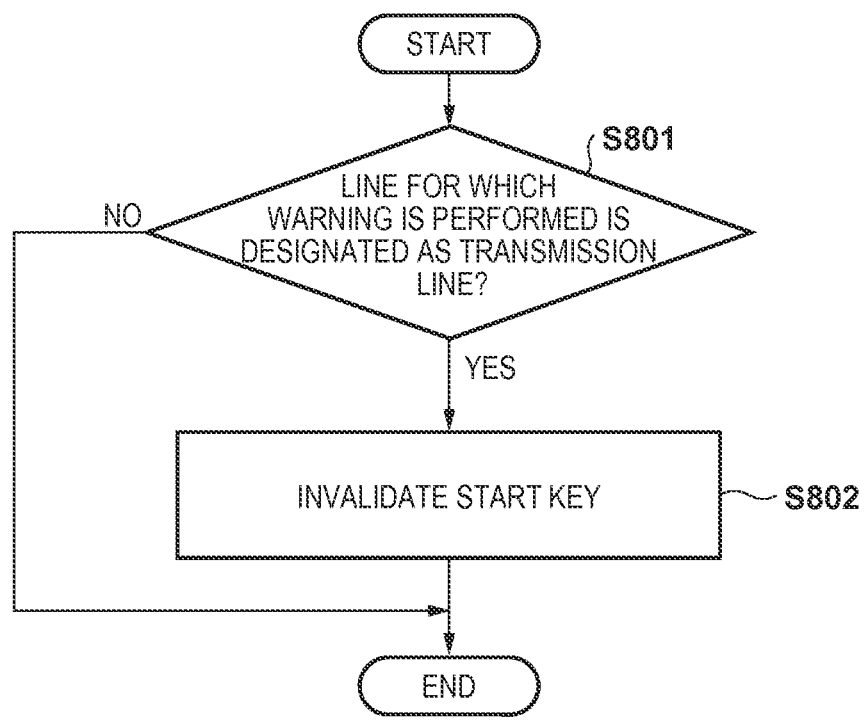
FIG. 8 is a flowchart for describing processing for invalidating a start key of the MFP according to the second embodiment.

FIG. 8 is a flowchart for describing the processing for invalidating the start key 703 in the MFP according to the second embodiment. Note that the program for executing this processing is stored in the ROM 102, and the processing shown in this flowchart is achieved by the CPU 101 executing that program.

In step S801, the CPU 101 determines whether or not the disconnected line, for which the warning notification is being performed in step S509, is selected as a line to be used for transmission. Here, if it is determined that the line is not selected as the line to be used for transmission, this processing is ended. However, if it is determined that the line is selected as the line to be used for transmission, the procedure advances to step S802. In step S802, the CPU 101 invalidates the start key 703 and ends this processing.

FIG. 7B indicates the case where the warning notification is printed as a report by the printer 121. Print data of this disconnected line detection report is generated by the CPU 101, and is output to the printer 121 so as to be printed. The illustrated report is basically the same as the warning message in FIG. 7A. This report includes a header part containing the printed date and time of the report (e.g., Friday 12 Nov. 2013, 14:50:55), a report title description part (e.g., disconnected line detection report) and a main text (e.g., the cable of the line 1 of this apparatus . . . ). Using this report, the warning that there is a disconnected line is given to the user.

Notification by this printed report provides an advantage in that on-time checking is possible, even if the user has not selected the FAX function.

FIG. 7C depicts a view illustrating an example of notification by an e-mail.

This e-mail is generated by the CPU 101, and ultimately transmitted via the LAN I/F unit 123 and the network 124 to an e-mail address such as that of the administrator of the MFP. The illustrated content of the e-mail is basically the same as the messages as shown in FIG. 7A and FIG. 7B. This e-mail includes a header part containing mail transmission date and time, a mail transmission source, an e-mail destination and a subject, and a main text (e.g., the cable of the line 1 of the MFP 0007 . . . ). Using such an e-mail, the user (here, the administrator) is warned that there is a disconnected line. In the case of e-mail notification, the name of the MFP is contained in the subject in order to specify the MFP that transmitted the e-mail.

In the case of notification by such an e-mail, similarly to the case of performing notification by printing a report, there is an advantage in that on-time checking is possible even if the user has not selected the FAX function, for example.

In this manner, according to the second embodiment, in the case where there is a disconnected line and there is a history of past transmission/reception via the disconnected line, it is possible to warn the user that the line is disconnected, and also to prompt the user to conduct the connection operation of the line.

Next, the processing of and after step S506 in FIG. 5 will be described.

If the CPU 101 determines in step S505 that there is no history indicating that the disconnected line has been used in the past, the procedure advances to step S506. In step S506, the CPU 101 confirms the usage registration state in the MFP regarding the disconnected line. Here, designation of a line in the settings of the MFP will be described.

Transmission Line Designation at the Time of Transmission

This designation is a function of designating, among a plurality of lines, a line to be used for transmission at the time of transmission. In this function, any of "auto", "line 1", and "line 2" can be selected, for example. The settings of "line 1" and "line 2" are respectively made to designate the line to be used for transmission, and the setting of "auto" is a setting for automatically selecting an available line from the plurality of lines.

The MFP has an address book, a one-touch address and a name dial address for storing transmission destinations in advance. A transmission line can be designated for each of these transmission destinations.

FIG. 12A depicts a view showing one example of a detail screen of facsimile destination registration. Here, an F code and a password are information prescribed by facsimile standards and conveyed from a transmitter to a receiver, and the receiver performs transfer of received data or the like based on this information. Moreover, the setting of a transmission speed and the settings of ON/OFF and line selection of ECM transmission (error correcting mode of a facsimile) can be made here.

Furthermore, FIG. 12A shows a destination registration screen of a facsimile, in which, in the case of transmitting without registering a destination as a new destination, a line selection shown at the lower right of FIG. 12A is displayed when the detail setting button 704 in the screen shown in FIG. 7A is pressed. A transmission line can be designated via this screen. In the case of a new destination, the line selected in this line selection is detected.

Telephone Number and Name of Each Line

This MFP has a function for storing a telephone number and a name of each line. For example, "03-1111-2222" as the telephone number of the line 1, and "general affairs department" as the name of the line 1 are registered. Moreover, for example, as for the line 2, "03-1111-2223" as a telephone number, "accounting department" as a name (not illustrated) are registered.

The telephone numbers and the names set here are notified to a partner device in a FAX procedure during FAX transmission.

Figure 12C:
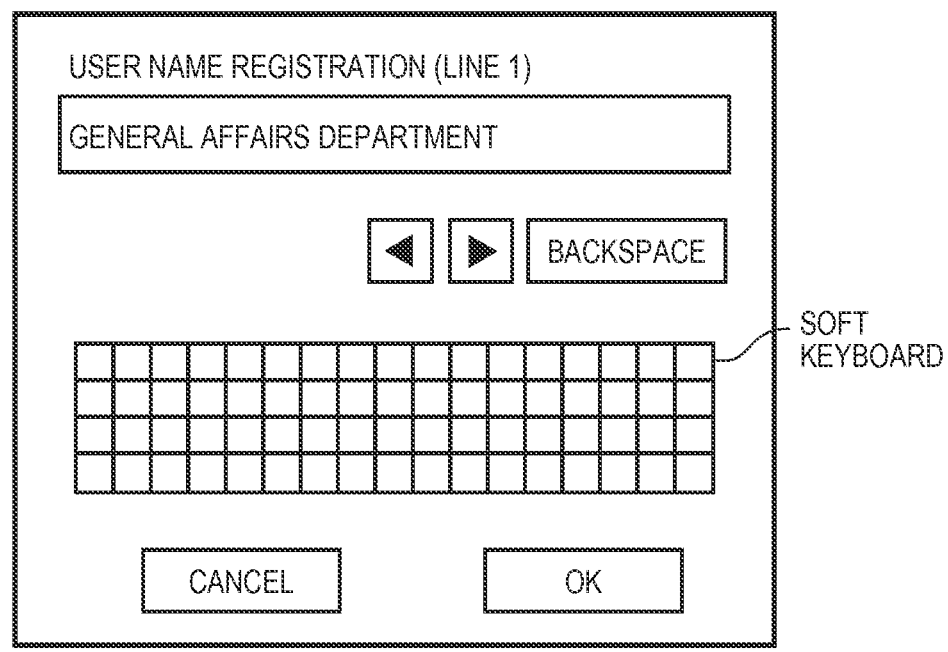

FIG. 12B depicts a view illustrating an example of the registration screen of the telephone number of the line 1 as the example thereof, and FIG. 12C depicts a view illustrating an example of the registration screen of the name of the line 1. These are not set when the MFP is purchased, and are set by a user.

Designation of Preferential Line/Transmission Prohibited Line in the Case Where Line Designation Is "Auto"

The MFP includes the above-described line designation at the time of transmission, and also includes priority line designation to designate which line among a plurality of lines is to be preferentially used for transmission in the case where the transmission line designation is "auto", and transmission prohibited line designation to designate a line through which transmission is prohibited in the case where the transmission line designation is "auto".

Figure 12D:
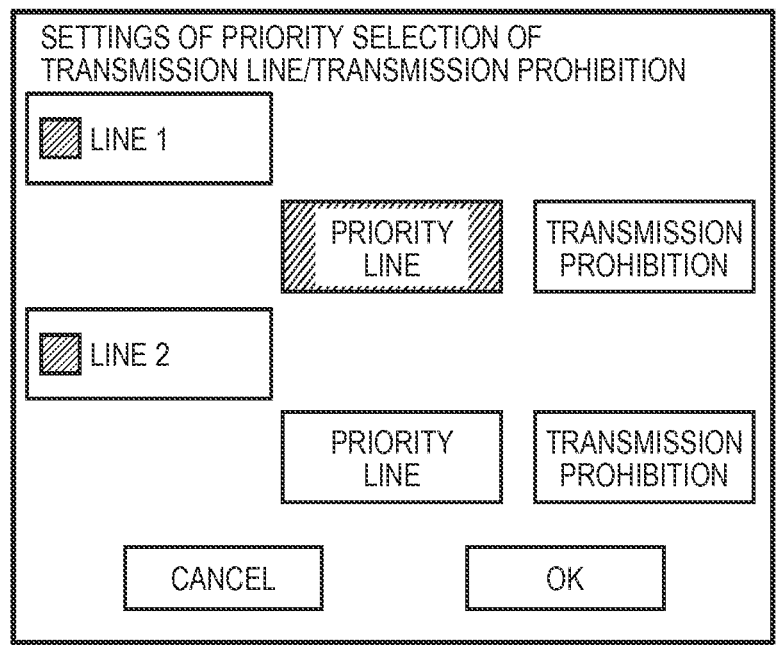

FIG. 12D depicts a view illustrating an example of the setting screen of the priority line/transmission prohibited line. Here, the MFP houses two lines (the line 1 and the line 2), and each of the lines can be set to the priority line or the transmission prohibited line. The setting of the priority line necessarily requires one line to be selected, but the setting of the transmission prohibited line is optional. In the example of FIG. 12D, the line 1 is set as the priority line.

Designation of Unavailable Line

This designation is a setting for making each of the lines connected to the MFP unavailable. The line designated here cannot be used anymore. FIG. 12E shows one example of the screen of the selection setting of a line to be used. It is possible to set each line to "to be used" or "not to be used". In the example in FIG. 12E, the line 1 and the line 2 are both set to "to be used".

Reception Line for Transfer Setting

The MFP has a receive and transfer function for transferring data received by FAX one time to a pre-registered transfer destination in the case where a designated condition is satisfied. These receive/transfer conditions include reception line designation for designating the line used for receiving data. For example, this designation is made such that the received data is transferred to a designated destination in the case where the line used for receipt of the data by FAX is the line 1. FIG. 12F shows one example of the setting screen of these transfer conditions. Here, as the transfer conditions, in addition to the reception line that indicates which line was used to receive the data, a communication partner's telephone number, an F code, a password and the like can be set. FIG. 12F shows the case where the line 1 is selected as the reception line and other settings have not been made as the transfer conditions.

When the CPU 101 obtains setting information indicating the use registration state in the MFP regarding a disconnected line in this manner in step S506, the procedure advances to step S507, and the CPU 101 determines whether or not the line determined to be disconnected has been set to be used for any of the above-mentioned various settings. Then, if the CPU 101 determines that the line determined to be disconnected has been set to be used for any of these settings, the procedure advances to step S508, and otherwise this processing is ended.

In this manner, it is possible to, if the line determined to be disconnected has been used in the past, or included among any of the usage registration in the MFP, give the user a warning message indicating that there is the disconnected line by displaying, printing, e-mail or the like.

Figure 9:
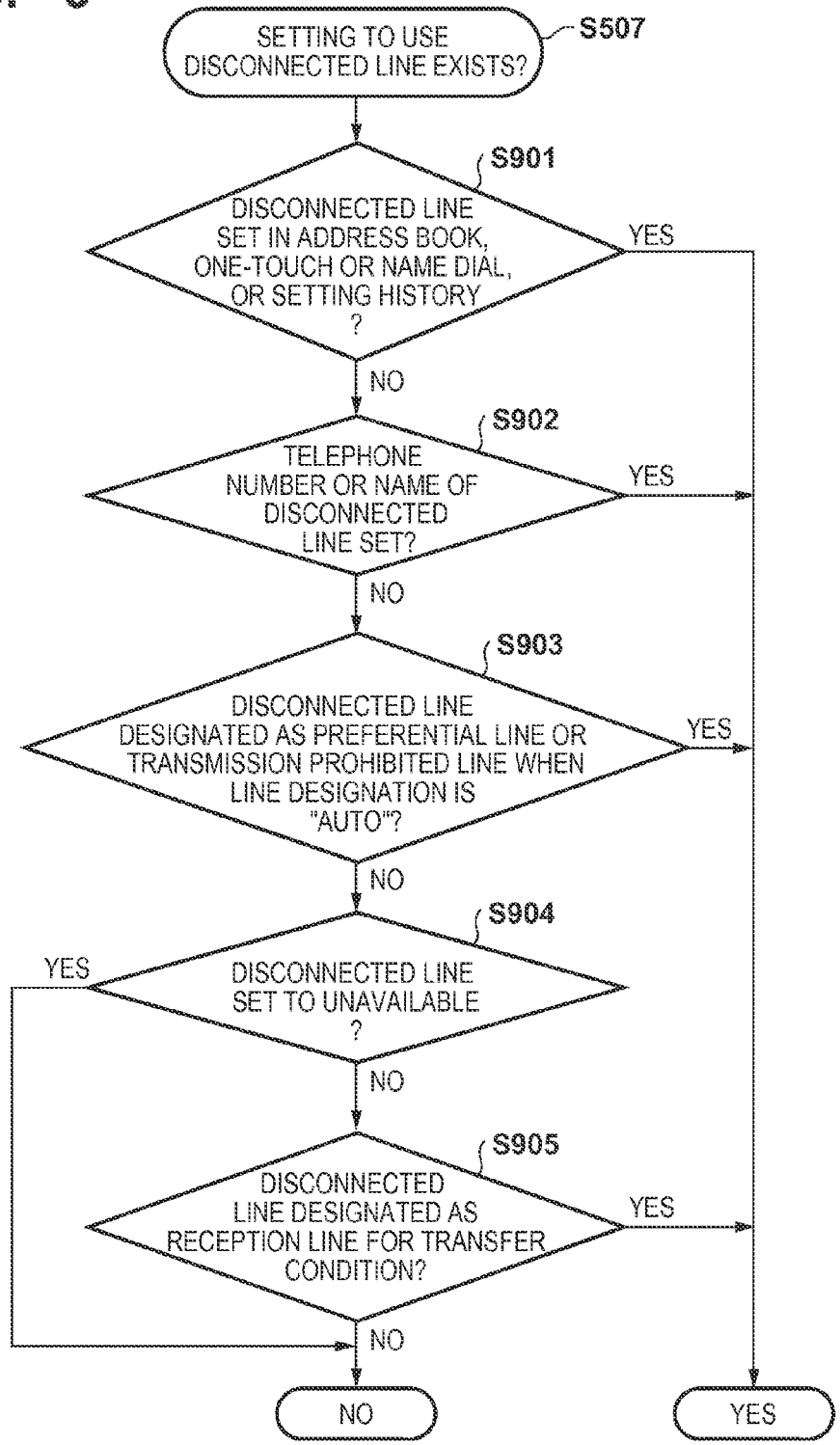
FIG. 9 is a flowchart for describing determination processing of step S507 in FIG. 5.

FIG. 9 is a flowchart for describing determination processing in step S507 in FIG. 5.

In step S901, the CPU 101 confirms the designation of the transmission line to be used at the time of transmission. Here, it is determined whether or not a line detected to be disconnected is included among lines registered in the address book, the one-touch dial and the name dial. In the case where it is determined here that the disconnected line is designated for any of the above, the determination is YES. Accordingly, the procedure advances to step S508 in FIG. 5 and warning notification is performed. On the other hand, in the case where the CPU 101 determines in step S901 that the disconnected line is not designated for any one of the above, the procedure advances to step S902. In step S902, the CPU 101 determines whether or not the telephone number or the name of the line detected to be disconnected is set in a storage unit (ROM 102 or RAM 103), and in the case where either the telephone number or the name is set, the determination is YES. On the other hand, in the case where the CPU 101 determines in step S902 that neither the telephone number or the name of that disconnected line is set, the procedure advances to step S903, and it is determined whether or not the line detected to be disconnected is set as either the priority line or the transmission prohibited line when "auto" is selected. In the case where the CPU 101 determines in step S903 that the line is set as either the priority line or the transmission prohibited line when "auto" is selected, the determination is YES.

On the other hand, in the case where the CPU 101 determines in step S903 that the disconnected line is set as neither the priority line nor the transmission prohibited line when "auto" is selected, the procedure advances to step S904, and the CPU 101 determines the setting state of the line detected to be disconnected. Because there is no need to perform a warning if the CPU 101 determines in step S904 that the setting of the disconnected line is in an unavailable state, the determination is NO and this processing ends. On the other hand, in the case where the CPU 101 determines in step S904 that the disconnected line is not set to unavailable, the procedure advances to step S905, and the CPU 101 determines whether or not the line detected to be disconnected is set as the reception line for the transfer setting. If the CPU 101 determines here that the disconnected line is set as the reception line, the determination is YES. On the other hand, in the case where the CPU 101 determines in step S905 that the disconnected line is not set as the reception line, the determination is NO.

If the line determined to be disconnected is included in any of the use registration in the MFP (the address book, the name dial, the telephone number, priority designation, unavailable, the transfer setting and the like) in this manner, a warning message indicating that the line is disconnected can be notified by displaying or printing the message, by using an e-mail or the like.

FIG. 10A to FIG. 10C are diagrams each showing one example of warning notification of the MFP according to the second embodiment.

FIG. 10A depicts a view illustrating a case where notification is performed by displaying a message on the display unit 701 of the console unit 118. On the lower left side of the console unit 118 of the MFP, there is the message display area 702 called a status line, where a warning message regarding the disconnected line is displayed. In the case where the message display area 702 is too small for displaying the warning message, or in the case where a plurality of warning messages are displayed at the same time, toggle display may be performed.

In the example of the illustrated message of FIG. 10A, in the case where a disconnected state of the line 1 is detected and the line is set as the transmission line used at the time of transmission, not only the disconnected state but also what setting has been made regarding the disconnected line is displayed.

By using such display, it is possible to notify the user that the line 1 is in the disconnected state, and to prompt the user to connect the cable if the line 1 is to be used. Furthermore, it is also possible to notify that needless setting of the line remains and to prompt the user to change the setting.

Furthermore, in the second embodiment, the MFP has a function for invalidating transmission via the disconnected line along with the above warning display. Because description thereof was made in the above-described first embodiment, it is omitted here.

FIG. 10B depicts a view illustrating an example of notification performed by printing a report using the printer 121. Print data of this report is generated by the CPU 101, and printed and output by the printer 121. The content of this report is the same as that in FIG. 10A. The report includes a header part containing the printed date and time of the report (e.g., Friday 12 Nov. 2013, 14:50:55), a report title description part (e.g., disconnected line detection report), and a main text (e.g., the cable of the line 1 of this apparatus . . . ).

In the case of notification using a report, there is an advantage in that on-time checking is possible even if the user has not selected the FAX function.

FIG. 10C depicts a view illustrating an example of notification using an e-mail. This e-mail is generated by the CPU 101, and ultimately transmitted via the network I/F unit 123 and the network 124 to an e-mail address such as that of the administrator of the MFP. The illustrated example of the e-mail is the same as those in FIG. 10A and FIG. 10B. This e-mail includes a header part containing mail transmission date and time, a mail transmission source, an e-mail destination and a subject, and a main text, and this e-mail is used for notifying the user of a warning. In the case of e-mail notification, the name of the MFP is contained at the subject in order to specify the MFP that transmitted the e-mail.

Such notification using an e-mail provides an advantage in that on-time checking is possible similarly to the case of the notification using a report, even if the user has not selected the FAX function.

As described above, according to the second embodiment, if a disconnected line is detected, it is possible to perform warning notification to a user only in the case where the line was used in the past or has been set to be used.

Moreover, it is possible to select a type of warning notification from among displaying, printing, and e-mail notification.

Third Embodiment

Next, the third embodiment for preventing a warning indicating that the line is disconnected from being output in the case where a specific line is not used any more due to transfer or relocation of the MFP or the like will be described. Note that the configuration, the system configuration and the like of the MFP according to the third embodiment are the same as those of the embodiments described above, and therefore description thereof is omitted.

In the above-described first and second embodiments, if there is a history of past communication using a disconnected line, or if the disconnected line has been registered to be used, warning notification is performed, indicating that the line is disconnected. However, if a line that was used before is no longer in use due to the relocation or transfer of the MFP or the like, warning notification indicating that the line not in use any longer is disconnected is always performed, which is bothersome to the user.

In order to eliminate this, in the third embodiment, in addition to a history of past communication, a communication history flag that is turned on when communication is started and is reset (turned off) when the electric power supply of the MFP is turned off is provided for each line. That is, this communication history flag stores the information on whether or not there was communication via a line after the power supply of the MFP is turned on. Then, even in the case where there is a history of past communication using a disconnected line or even in the case where usage registration setting regarding the disconnected line is set, warning notification is not performed if the communication history flag of the line is off.

Figure 11:
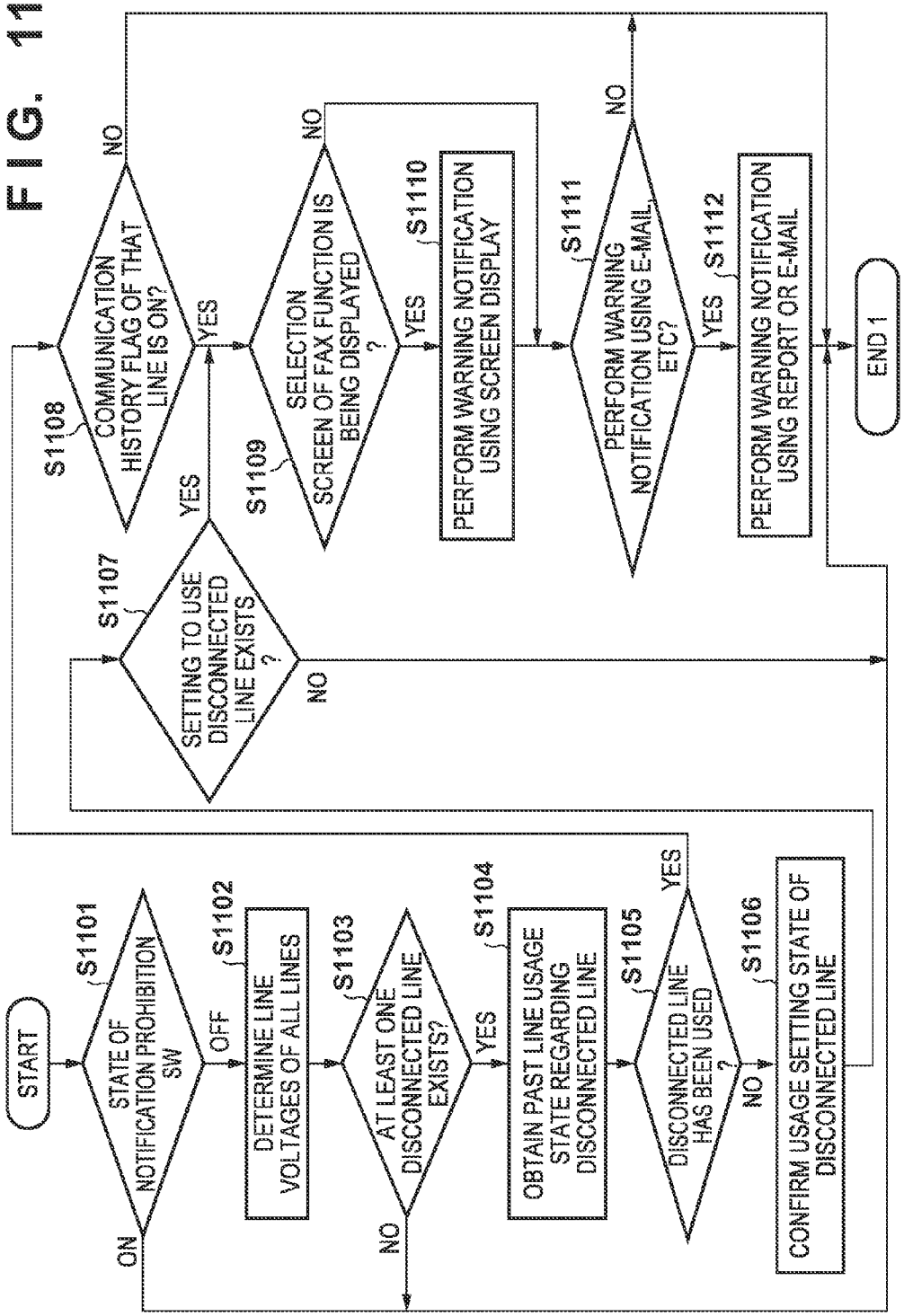
FIG. 11 is a flowchart for describing processing for performing a warning when there is a disconnected line in the MFP according to a third embodiment of the present invention.

FIG. 11 is a flowchart for describing the processing for performing a warning when there is a disconnected line with respect to the MFP according to third embodiment of the present invention. Note that the program for executing this processing is stored in the ROM 102, and the processing illustrated by this flowchart is achieved by the CPU 101 executing the program.

Note that step S1101 to step S1107 and step S1109 to step S1112 in FIG. 11 are the same as step S501 to step S507 and step S508 to step S511 in FIG. 5 described above, and therefore description thereof is omitted.

In step S1108, the CPU 101 determines whether or not the communication history flag is on. In the case where it is determined that the flag is on, that is, transmission/reception was performed using the line in the past, it is determined that the line has been used, and the procedure advances to step S1109 and warning notification is performed. On the other hand, if the communication history flag is off, it is determined that the line has not been used, and this processing ends without performing warning notification.

As described above, according to the third embodiment, if it is presumed that there is a line that is actually no longer in use, it is possible to determine that the line is out of use such that warning notification is not performed even if the line is disconnected. Accordingly, needless warning notifications can be prevented.

As described above, according to the third embodiment, in the case where a disconnected line is detected, if there is a history indicating that the line has been used in the past, or if usage registration of the line is set, it is possible to perform warning notification to a user. Accordingly, it is possible to eliminate needless warning notification regarding a disconnected line so as to appropriately give warning notification to the user.

Moreover, if the disconnected line has been used in the past, latest usage date of the line is also notified, and therefore since when the line was disconnected can be estimated.

Furthermore, in the case where a line is registered to be used with the device (apparatus) although the line is disconnected, notification for indicating that the line is disconnected is performed and the contents of the settings are also notified, enabling the user to change the settings if necessary.

Furthermore, in the case where it is presumed that a disconnected line has actually no longer in use, it is possible for the line to be regarded not in use so that needless warning notification regarding the disconnected line is suppressed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)BD) the functions of one or more of the a and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182499, filed Sep. 8, 2014, which is hereby incorporated by reference herein in its entirety.

What is claimed is:

1. A communication apparatus comprising:
   a history storage unit configured to store a history of transmission/reception via a line in association with the line;
   a detection unit configured to detect whether or not the communication apparatus is physically connected to the line;
   a first determination unit configured to, if the detection unit detects that the line is disconnected, determine whether or not a history of transmission/reception regarding the disconnected line is stored in the history storage unit; and
   a notification unit configured to notify a user that the line is disconnected if the first determination unit determines that the history of transmission/reception regarding the disconnected line is stored in the history storage unit.

2. The communication apparatus according to claim 1, wherein the communication apparatus can be connected to a plurality of lines,
the history storage unit stores a history of transmission/reception via each of the plurality of lines, and
the detection unit detects whether or not the communication apparatus is physically connected to each of the plurality of lines.

3. The communication apparatus according to claim 1, wherein the notification unit performs notification including a date and time of latest transmission/reception extracted from the history of transmission/reception regarding the disconnected line stored in the history storage unit.

4. The communication apparatus according to claim 1, further comprising:
a selection unit configured to select any one of displaying, printing or e-mailing for the notification unit to notify that the line is disconnected.

5. The communication apparatus according to claim 4, wherein the selection unit, in a case where an operation screen of a transmission function is displayed on a display unit, selects displaying to notify that the line is disconnected.

6. The communication apparatus according to claim 1, wherein the communication apparatus is capable of being connected to a plurality of lines, and further comprises:
a registration unit configured to register, for each of the lines, a setting as a transmission destination, a setting of a telephone number or a name, or setting information set as a transfer destination; and
a second determination unit configured to, if the first determination unit determines that the history of transmission/reception regarding the disconnected line is not stored in the history storage unit, determine whether or not the disconnected line is registered in the registration unit,
wherein the notification unit notifies the user that the line is disconnected if the second determination unit determines that the disconnected line is registered in the registration unit, even in a case where the first determination unit determines that the history of transmission/reception regarding the disconnected line is not stored in the history storage unit.

7. The communication apparatus according to claim 1, further comprising:
an invalidation unit configured to invalidate an operation of a designation unit configured to designate a start of transmission if a line designated to be used for transmission is detected to be disconnected by the detection unit.

8. The communication apparatus according to claim 1, wherein the detection unit detects whether or not the communication apparatus is physically connected to the line, based on whether or not a line voltage is 0 V.

9. The communication apparatus according to claim 1, wherein the detection unit detects whether or not the communication apparatus is physically connected to the line, using a silicon DAA and a modem.

10. The communication apparatus according to claim 1, wherein the notification unit does not notify the user that the line is disconnected, if the first determination unit determines that the history of transmission/reception regarding the disconnected line is not stored in the history storage unit.

11. The communication apparatus according to claim 6, wherein the notification unit does not notify the user that the line is disconnected, if the first determination unit determines that the history of transmission/reception regarding the disconnected line is not stored in the history storage unit and the second determination unit determines that the disconnected line is not registered in the registration unit.

12. The communication apparatus according to claim 1, further comprising:
a storage unit configured to store, in addition to a history of transmission/reception via the line, information indicating whether or not there has been communication via the line after a power supply of the communication apparatus is turned on,
wherein the notification unit notifies the user that the line is disconnected, if the first determination unit determines that the history of transmission/reception regarding the disconnected line is stored in the history storage unit and the storage unit stores information indicating that there has been communication.

13. The communication apparatus according to claim 12, the information indicating whether or not there has been communication stored in the storage unit is erased when the power supply of the communication apparatus is turned off.

14. A method of controlling a communication apparatus, comprising:
storing, in a memory, a history of transmission/reception via a line in association with the line;
detecting whether or not the communication apparatus is physically connected to the line;
if it is detected in the detecting that the line is disconnected, determining whether or not a history of transmission/reception regarding the disconnected line is stored in the memory; and
notifying a user that the line is disconnected if it is determined in the determining that the history of transmission/reception regarding the disconnected line is stored in the memory.

15. A non-transitory computer-readable storage medium storing a computer program for causing the computer to function as a communication apparatus comprising:
a history storage unit configured to store a history of transmission/reception via a line in association with the line;
a detection unit configured to detect whether or not the communication apparatus is physically connected to the line;
a first determination unit configured to, if the detection unit detects that the line is disconnected, determine whether or not a history of transmission/reception regarding the disconnected line is stored in the history storage unit; and
a notification unit configured to notify a user that the line is disconnected if the first determination unit determines that the history of transmission/reception regarding the disconnected line is stored in the history storage unit.

* * * * *